United States Patent
Borean et al.

(10) Patent No.: US 8,265,695 B2
(45) Date of Patent: Sep. 11, 2012

(54) METHOD FOR THE MANAGEMENT OF A PERIPHERAL UNIT BY A SIM CARD IN WIRELESS COMMUNICATION TERMINALS, AND PERIPHERAL UNIT FOR IMPLEMENTING THE METHOD

(75) Inventors: Claudio Borean, Turin (IT); Tiziana Tambosso, Turin (IT)

(73) Assignee: Telecom Italia S.p.A., Milan (IT)

(*) Notice: Subject to any disclaimer, the term of this patent is extended or adjusted under 35 U.S.C. 154(b) by 932 days.

(21) Appl. No.: 11/919,493

(22) PCT Filed: Apr. 29, 2005

(86) PCT No.: PCT/EP2005/004645
§ 371 (c)(1),
(2), (4) Date: Oct. 29, 2007

(87) PCT Pub. No.: WO2006/117009
PCT Pub. Date: Nov. 9, 2006

(65) Prior Publication Data
US 2009/0054104 A1 Feb. 26, 2009

(51) Int. Cl.
*H04B 1/38* (2006.01)
(52) U.S. Cl. ....... 455/558; 455/410; 455/411; 455/41.1; 455/41.2; 380/247; 235/492; D13/147
(58) Field of Classification Search .......... 455/558, 455/410, 411, 41.1, 41.2; 235/492; D13/147; 380/247
See application file for complete search history.

(56) References Cited

U.S. PATENT DOCUMENTS

| | | | |
|---|---|---|---|
| 6,345,988 B1* | 2/2002 | Ketcham | 439/74 |
| 6,405,278 B1 | 6/2002 | Liepe | |
| 6,925,560 B1* | 8/2005 | Basquin | 713/169 |
| 2002/0082992 A1 | 6/2002 | Ritter | |
| 2002/0091704 A1 | 7/2002 | Bayer | |
| 2004/0176071 A1 | 9/2004 | Gehrmann et al. | |

FOREIGN PATENT DOCUMENTS

| | | |
|---|---|---|
| DE | 10 2004 014419 | 12/2004 |
| EP | 0 820 178 A2 | 1/1998 |
| EP | 1191451 | 3/2002 |
| EP | 1 001 358 A2 | 5/2002 |
| EP | 1 001 358 A3 | 5/2002 |
| EP | 1 519 522 A2 | 3/2005 |
| JP | 2001-352374 | 12/2001 |

(Continued)

OTHER PUBLICATIONS

"Bluetooth Enabled Sim-Card"; Research Disclosure, Mason Publications, vol. 439, No. 6, pp. 1-2, (2000).

(Continued)

*Primary Examiner* — Nghi H Ly
(74) *Attorney, Agent, or Firm* — Finnegan, Henderson, Farabow, Garrett & Dunner, L.L.P.

(57) ABSTRACT

A wireless communication terminal includes a SIM card and a memory card equipped with respective radio transceivers for allowing a terminal-independent and network-independent radio communication between both cards. Server and client applications on the controllers of the transceivers allow the SIM to manage the memory card. The memory card tries to become connected to the SIM. If connection is successful, the SIM authenticates the memory card and then configures it, in secure mode, to set the access policy to the memory card itself.

18 Claims, 6 Drawing Sheets

FOREIGN PATENT DOCUMENTS

| | | |
|---|---|---|
| JP | 2002-099475 | 4/2002 |
| JP | 2002-344620 | 11/2002 |
| JP | 2004-193722 | 7/2004 |
| WO | WO-99/59360 | 11/1999 |
| WO | WO-00/59243 | 10/2000 |
| WO | WO-01/80193 A1 | 10/2001 |
| WO | WO-01/95605 A1 | 12/2001 |
| WO | WO 02/21867 | 3/2002 |
| WO | WO 02/091704 | 11/2002 |
| WO | WO-03/073370 A1 | 9/2003 |
| WO | WO-2004/002176 A1 | 12/2003 |
| WO | WO-2006/056220 A1 | 6/2006 |

OTHER PUBLICATIONS

3GPP TS 51.011 V4.14.0; Specification of the Subscriber Identity Module—Mobile equipment (SIM—ME) Interface (Release 4); $3^{rd}$ Generation Partnership Project; Technical Specification Group Terminals; pp. 1-169, (Mar. 2005).

Communication pursuant to Article 94(3) EPC dated Sep. 25, 2009 from the European Patent Office in corresponding European application No. 05 744 877.1-1249.

Haartsen; "The Bluetooth Radio System", IEEE Personal Communications, IEEE Communications Society, US, vol. 7, No. 1, XP011092382 ISSN: 1070-9916, pp. 28-36, (2000).

* cited by examiner

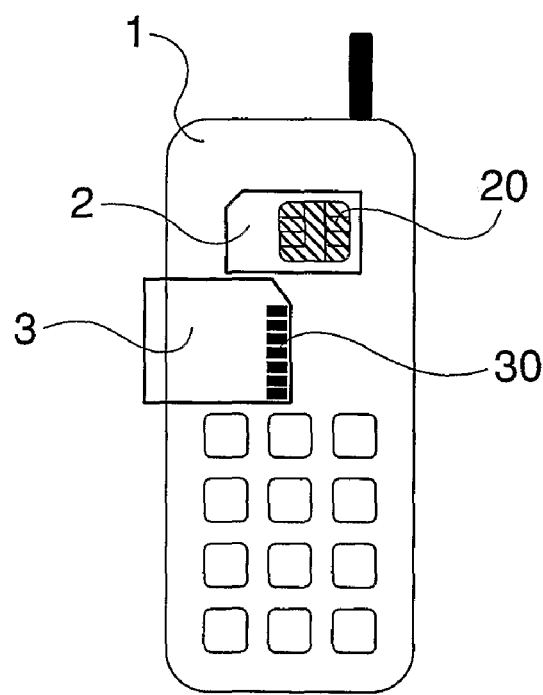
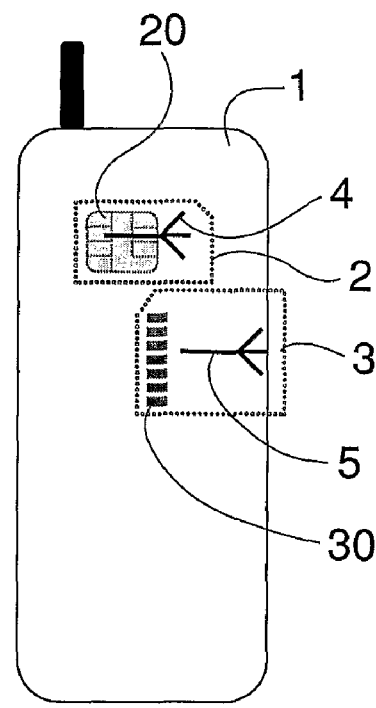
Fig. 1A             Fig. 1B
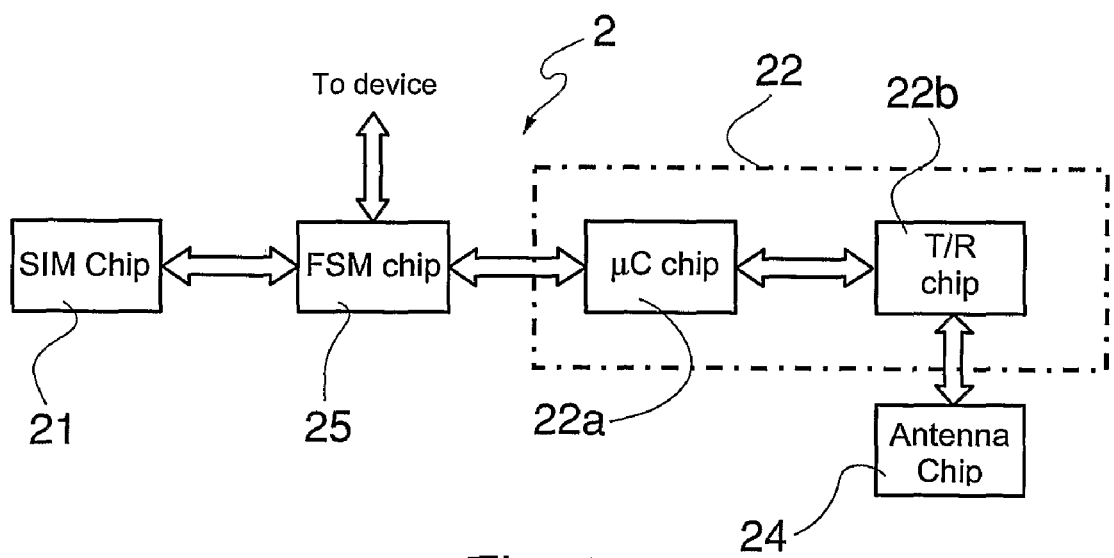
Fig. 2

METHOD FOR THE MANAGEMENT OF A PERIPHERAL UNIT BY A SIM CARD IN WIRELESS COMMUNICATION TERMINALS, AND PERIPHERAL UNIT FOR IMPLEMENTING THE METHOD

CROSS REFERENCE TO RELATED APPLICATION

This application is a national phase application based on PCT/EP2005/004645, filed Apr. 29, 2005, the content of which is incorporated herein by reference.

FIELD OF THE INVENTION

The present invention refers to wireless communication terminals, and more particularly it concerns a method of managing a peripheral unit, such as a memory card, by a subscriber identity unit of one such terminal, as well as the peripheral unit capable of being so managed.

The term "subscriber identity unit" is used herein to denote a terminal component having, inter alia, user identification functions when the user tries to become connected to a communication network.

BACKGROUND OF THE INVENTION

There is an ever growing interest of telecommunication operators and industry, as well as of service providers, in offering customers of wireless communication networks, such as satellite networks or land mobile networks, the possibility of using their terminals for a variety of applications and in a variety of environments, besides the conventional communication functions.

Some of such new features entail the provision of dedicated peripheral units on the terminal. A widely diffused example is a cellular phone equipped with a digital camera and a removable memory card for storing the pictures shoot by the camera.

Presently, a terminal equipment controls the subscriber identity unit and the peripheral unit (e.g. a memory card) through separate physical and logical channels, and acts on these peripherals as a master in order to perform services which exploit their features separately, i.e. the terminal equipment keeps always the control of the communication.

A mobile phone, for example, exchanges data with the SIM card through a standard interface defined in the 3GPP TS 51.011, while a memory card in the same terminal communicates through its proprietary protocol which depends on the memory card type (i.e. multimedia card, Secure Digital™ card, Memory Stick™).

At present, communication between different components in a mobile terminal, e.g. a subscriber identity unit (the SIM card in 2nd generation mobile terminals or the Universal SIM, U-SIM card in 3rd generation mobile terminals) and a peripheral unit like a memory card is generally not possible, however implementation of such feature would require hardware and/or software modifications in the mobile terminal.

On the other hand it is well known in the art associating SIM cards and memory cards with transceivers for wireless communications, in particular radio communications, for a variety of purposes.

For instance, EP 0 820 178 A discloses a SIM card in which the radio transceiver allows using the terminal for monetary transactions. WO 01/80193 A discloses a SIM card in which the radio transceiver is used for interrogating meters of utility companies. WO 99/59360 A discloses a SIM that can be used by different terminals and that is associated with a wireless communication means for transmitting data, including identity data, to one of such terminals; data transmission can take place in ciphered form. U.S. Pat. No. 6,405,278 B and EP 1 001 358 A disclose flash memories equipped with transceivers for data exchange between the flash memory card and another device.

The Applicant has observed that the prior art documents however only disclose communication of the SIM card or the memory card with external devices, and no suggestion is found about the possibility of setting up a direct communication between the SIM and another peripheral unit without passing through the terminal.

The Applicant has tackled the problem of setting up a secure and terminal-independent communication between a SIM and a peripheral unit such as a memory card. The term SIM, as used herein, includes also the U-SIM and other subscriber identity modules, i.e., modules designed to be used in combination with terminals of a communication network, typically a wireless communication network, to provide at least a user identification and authentication function. For instance, taking into account that the SIM dialogues with the wireless communication network, a terminal-independent communication between the SIM and a peripheral unit could allow the network operator to manage, through the SIM, applications residing on the peripheral unit, without being constrained by the terminal characteristics: an example could be the management of a memory card with ancillary hardware accelerator functions (e.g. for data ciphering) as a data memory or for multimedia functions. The "trusted" characteristics of the SIM would afford the necessary security to the management operations.

In particular, the Applicant has tackled the problem of providing a peripheral unit whose utilization is subject to some check about the subscriber's authorisation, so that for example a memory card can be used for storing sensitive or private data.

SUMMARY OF THE INVENTION

The Applicant has found that this problem can be solved by establishing a wireless connection between the SIM card, which stores the information for user authentication, and the peripheral unit (e.g. the memory card), thus allowing both the check mentioned above and a direct and secure communication between them.

In a first aspect, the invention relates to a method of management of a peripheral unit by means of a subscriber identity unit of a terminal of a communication network, via a terminal-independent communication between the peripheral unit and the subscriber identity unit.

In a second aspect, the invention relates to a peripheral unit that can be managed by a subscriber identity unit of a terminal of a communication network, via a terminal-independent communication between the peripheral unit and the subscriber identity unit.

According to the invention, a method for the management of a peripheral unit by a subscriber identity unit of a communication terminal includes:

equipping said subscriber identity unit and said peripheral unit with respective radio transceiver modules providing for a radio communication between said units;

setting up a connection between said transceiver modules for supporting said radio communication; and recognising and authenticating said peripheral unit by said subscriber identity unit via said radio communication.

A peripheral unit allowing implementation of the method includes a client application in a control part of a radio transceiver provided in said peripheral unit, said client application being arranged to communicate, via said radio communication, with a server application in a control part of a corresponding radio transceiver module provided in a subscriber identity unit for at least the recognition and authentication of said peripheral unit by said subscriber identity unit.

In the preferred embodiment of the invention, the transceiver modules are transceivers for Personal Area Network (PAN) applications and are based on the ZigBee™ technology.

BRIEF DESCRIPTION OF THE DRAWINGS

Further objects, characteristics and advantages of the invention will become apparent from the following description of preferred embodiments, given by way of non-limiting example and illustrated in the accompanying drawings, in which:

FIGS. 1A and 1B are front and rear views, respectively, of a terminal with a SIM card and a flash memory card equipped with wireless transceivers for the implementation of the invention;

FIG. 2 is a block diagram of a SIM card equipped with a ZigBee™ transceiver;

DESCRIPTION OF THE PREFERRED EMBODIMENTS

Figure 3:
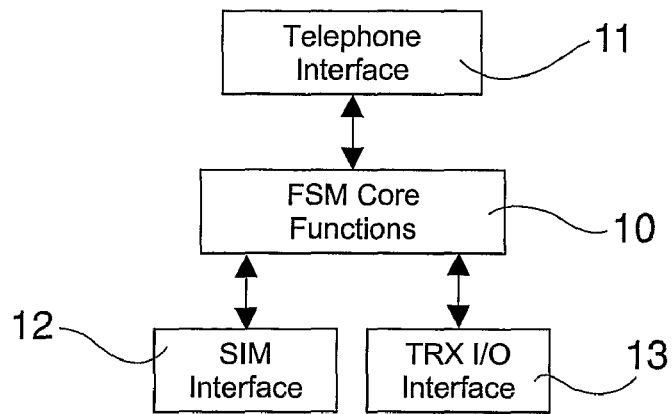
FIG. 3 is a block diagram of the finite state machine interconnecting the SIM chip and the ZigBee™ transceiver in the SIM card of FIG. 2.

FIGS. 1A and 1B are a front and a rear view, respectively, of a cellular phone 1 having a SIM card 2 and a removable peripheral unit 3, e.g. a flash memory card. Flash memory cards commonly used in association with a cellular phone are for instance the Multimedia Memory Card (MMC), the Secure Digital (SD) Card, the SmartMedia Card or the CompactFlash (CF) card. Reference numerals 20, 30, respectively, denote the conventional contacts in cards 2, 3 for their standard communication with the other components of terminal 1.

According to the invention, cards 2, 3 are further equipped with respective radio transceivers, schematised in these Figures by antennas 4, 5, allowing a terminal-independent communication between cards 2, 3 for the management of memory card 3 by SIM 2 according to the invention.

This allows implementing an architecture in which the operation of memory card 3 is enabled only in the presence of a SIM 2 capable of authenticating it. Thanks to the trusted functionalities typical of a SIM, also memory card 3 becomes a secure element, controlled by the SIM. In this manner, an additional tool becomes available to a wireless network operator for managing a memory card (or any other peripheral unit inserted into the terminal), and the operator can exploit and generalise the features of "trusted" element of the network typical of the SIMs.

Preferably, transceivers 4, 5 are transceivers for Personal Area Network (PAN) applications: this choice is dictated by the fact that such transceivers are devices that can be strongly miniaturised and that offer the possibility of enabling new value added services, so that they are suitable for co-operation in particular with a SIM card.

Examples of transceivers of this kind are those using the Bluetooth™ technology, whose characteristics are disclosed in IEEE Standard 802.15.1. Those transceivers allow create short range, dynamically varying networks, each capable of communicating with an adjacent network of the same kind to provide a wider coverage. SIM cards equipped with Bluetooth™ transceivers are disclosed for instance in the above-mentioned WO 01/95605 A and WO 99/59360 A.

In a preferred embodiment of the invention however said transceivers exploit the ZigBee™ technology, whose features are disclosed in the homonymous standards and, as far as the physical level of the communication protocol are concerned, also in IEEE Standard 802.15.4. ZigBee™ devices are of particular interest due to their low power consumption and to their capability of self-reconfiguration into an "ad-hoc" network, allowing an indirect information transfer from one network node to another. Another feature of the ZigBee™ technology, which is of interest for use of such technology on an integrated circuit card, such as a SIM card or a flash memory card, for a mobile terminal is the possibility of integrating both the analogue transmission part and the whole communication protocol on a same chip.

Thus, the following description will assume that transceivers 4, 5 on SIM card 2 and memory card 3, respectively, are ZigBee™ transceivers. Where necessary, reference will be made to transceivers operating at 2.45 GHz. Moreover, for sake of clarity, the description will refer to a memory card 3 based on Multimedia Memory Card architecture. The SIM and the MMC equipped with ZigBee™ transceivers will be referred to hereinafter in short as Z-SIM and Z-MMC.

FIG. 2 shows a block diagram of Z-SIM 2, in the hypothesis that the same chips as would conventionally be used for non-joint SIM cards and transceivers are still used. Of course, the SIM and transceiver functions could also be at least partially integrated on a same ad-hoc chip, when the commercial success of terminals requiring such combined functions justifies so. The illustrated embodiment of Z-SIM 2 includes SIM chip 21 performing the standard SIM functions (typically, user identification, security, encryption, preferably also services provided by the operator . . . ), a ZigBee™ transceiver module 22 associated with a radiating element 24, and a finite state machine module 25 (FSM chip) that manages the interoperability of telephone 1 and SIM chip 21 with ZigBee™ transceiver module 22, while guaranteeing the standard communication between SIM chip 21 and telephone 1.

A SIM card like that shown in FIG. 2 is described in International Patent Application PCT/EP2004/013378 filed on Dec. 13, 2004 in the name of the present Applicant. For sake of easiness of understanding and completeness of the disclosure, the structure and operation of FSM module 25 will now be shortly explained with reference to FIGS. 3 and 4.

As shown in FIG. 3, FSM module 25 consists of a logic unit 10 performing the core functions of the FSM, and interfaces 11, 12 and 13 connecting the FSM to the different units among which communication is to be allowed.

More particularly, interfaces 11, 12 connect FSM module 25 with mobile terminal 1 and SIM chip 21, respectively, and guarantee the conventional use of SIM 2 by terminal 1. They may be for instance interfaces compliant to ISO standard 78125. Interface 13 connects FSM module 25 with transceiver module 22, and it can be for instance of the SPI (Serial Peripheral Interface) type. Interfaces 13 and 11 (or 12, respectively) allow FSM module 25 to set up a direct communication between transceiver module 22 and terminal 1 or between transceiver module 22 and SIM chip 21, respectively.

The capability of a direct communication between transceiver 22 and SIM chip 21 can be exploited for managing the security issues relating to communications of transceiver module 22, for instance for encryption key exchange. Such a direct connection allows keeping all security functions in SIM chip 21.

Core unit 10 manages the communications, through the proper interfaces, between the various units connected to FSM module 25 by assigning different priorities to the different communications, and arbitrates, based on said priorities, concurrent communication requests. More particularly, the maximum priority will be allotted to the communication between telephone 1 and SIM chip 21, that is to the standard operation of telephone 1.

Figure 4:
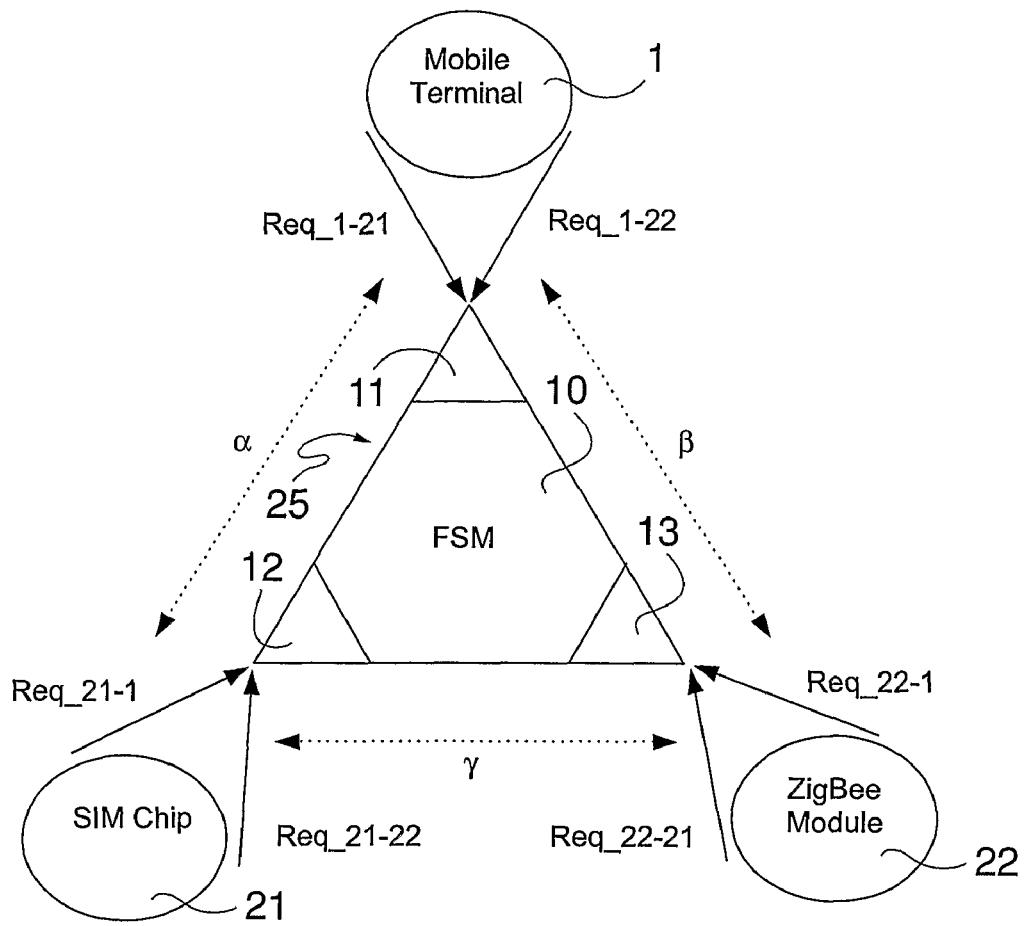
FIG. 4 is a graphical representation of the communications that can be set up among the SIM chip, the transceiver and the terminal through the finite state machine.

The different communication possibilities are graphically shown in FIG. 4.

Symbols α, β, γ denote the links for communication between terminals and SIM chip 21, between terminal 1 and transceiver module 22, and between SIM chip 21 and transceiver module 22, respectively. Those links correspond to logical connections set up through the pins of the various chips and the contacts of the SIM card.

As said, the three links are allotted respective different priorities, the highest priority being allotted to links α and the lowest to links β.

Maintaining the conventional functions of mobile terminal 1 is of course the most important issue: that is why the highest priority is allotted to links α. The second rank is allotted to links γ, in order to permit security key exchange between SIM chip 21 and transceiver module 22 before any communication involving the transceiver. Lastly, the communication between transceiver module 22 and an application residing in terminal 1 and requiring use of such transceiver is allotted the lowest priority: such a communication can be stopped and resumed, and the data from a radio link interesting transceiver module 22 can be buffered and recovered.

Arrows Req_x-y (x, y=1, 21, 22) indicate the access requests by any of units 1, 21 and 22 to another unit, which requests will be interpreted by FSM core unit 10 that will set up the proper connections.

Let us consider in particular the communications between terminal 1 and SIM chip 21 upon occurrence of a standard "telephone" event, such as a telephone call or an SMS. If no communication is in progress between SIM chip 21 and transceiver chip 22 or between transceiver chip 22 and terminal 1 when the telephone event occurs, terminal 1 will directly access SIM chip 21 through interfaces 11 and 12. However, transceiver module 22, if it is operating within the PAN, can continue its current operation (for instance, a communication with node 8) and will make available any processing result to terminal 1 as soon as unit 10 will authorise this.

If a communication between SIM chip 21 and transceiver module 22 is in progress when the standard "telephone" event occurs, unit 10 will stop it, will "freeze" the corresponding states for later resumption of the communication and will connect terminal 1 and SIM chip 21 as before.

Lastly, if terminal 1 is executing an application using transceiver module 22, the same application will postpone the ongoing process. After reception of the corresponding request, unit 10 will set up the direct connection between terminal 1 and SIM chip 21 and will resume the "frozen" transceiver application when the telephone event has ended.

Coming back to FIG. 2, in the illustrated embodiment ZigBee™ module 22 is made of two chips 22*a*, 22*b*. Chip 22*a* is a dedicated micro-controller (typically, an 8-16 bit controller) with suitable memories (e.g. RAM and flash memories) through which the whole ZigBee™ protocol stack, from certain functions of MAC level to the application level, is implemented. Chip 22*b* in turn performs the reception-transmission functions, and includes also the analogue part of the ZigBee™ node. However, the functions of module 22 can be implemented also by a single chip including the whole protocol stack, from the physical layer to the networking and application functions. Both two-chip and single-chip transceiver modules are commercially available. Examples are components from Chipcon, series CC2X20 for multi-chip systems (e.g. CC2420) together with Atmega AVR 128L microcontroller from Atmel, and series CC2X30 for single chip transceivers. Another commercial component for the transceiver module could be EM2420 from Ember Corporation.

The transceiver also comprises a radiating element 24, shown here as a chip antenna. A chip antenna has the necessary compact size (L=6.5 mm, W=2.2 mm, H=1.0) in order to meet size constraints imposed by SIM card 2, has a low cost and is suitable for applications using a 2.45 GHz transmission frequency, according to IEEE standard 802.15.4. A printed antenna could however also be used. A component suitable for the antenna is component "tiny ANT-2.45-CHP" from Linx Technologies.

For allowing Z-SIM 2 to manage Z-MMC 3 according to the invention, a suitable firmware in which a server application is implemented must be provided in controller chip 22*a* (or in the control part of the single transceiver chip). In particular, such server application is to process authentication requests coming from a client application on transceiver module 5 (FIG. 1) on memory card 3, as it will be described in more detail hereinafter.

Figure 5:
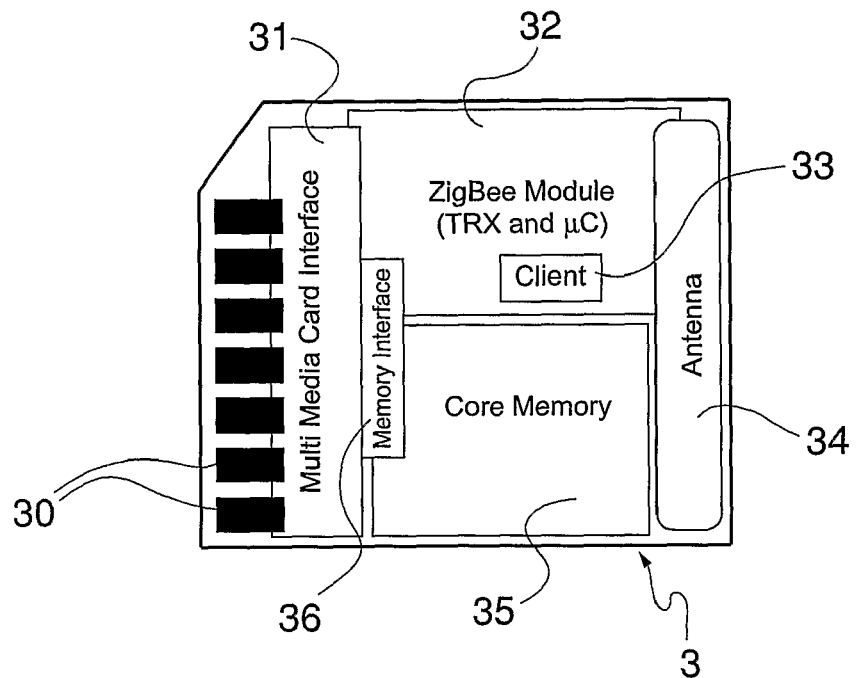
FIG. 5 is a functional diagram of a memory card equipped with a ZigBee™ transceiver.

FIG. 5 is a functional diagram of Z-MMC 3.

Card 3 may be implemented through a Multi Media Card of the class I/O cards, as defined in MMCA (MMC Association) System specification 3.31. Further details about said specification can be found at the MMCA site www.mmca.org. In the present case, the following modules can be identified:

Multi Media Card Interface 31: this is the unit allowing connection of Z-MMC 3 with an external device (host), in the present case terminal 1, through contacts 30. According to the present standards, contacts 30 can be used in two different modes, namely SPI (Serial Peripheral Interface) mode or Multi Media Card mode, which differ in the use of some memory pins and in the operating rate. The mode chosen will depend on the host characteristics: typically, in case of mobile telephones, Multi Media Card mode is implemented.

ZigBee™ module 32: this module substantially corresponds with module 22 (FIG. 2) of Z-SIM 2. It includes therefore analogue transceiver functionalities for signal transmission and reception according to ZigBee™ standard, as well as a control function through which the whole ZigBee™ protocol stack is implemented. The module also includes the units for the necessary analogue-to-digital and digital-to-analogue conversions, as well as a hardware accelerator for ensuring the security functions required by the standard, in particular for ciphering. It is connected to MMC interface 31 through synchronous interfaces of the SPI type, or asynchronous interfaces of UART (Universal Asynchronous Reception Transmission) type.

ZigBee™ module firmware (Client) 33: this unit has been represented separately of module 32 because it performs additional functions required for the implementation of the invention and not provided for by standard ZigBee™ modules. It is a client application managing Z-MMC enabling after Z-MMC 3 has been successfully authenticated via a radio communication with the corresponding server application in controller 22a of Z-SIM transceiver module 22. This will be discussed in detail below.

Antenna module 34: the same considerations made in connection with antenna 24 apply also to antenna 34.

Core Memory 35: it is e.g. a flash memory, which may be used for:
  increasing the memory area used by the applications residing on ZigBee™ module 32;
  increasing the memory area used by the applications residing on Z-SIM 2: that is, it allows a remotisation of Z-SIM 2 memory through the radio connections between Z-SIM 2 and MMC 3;
  storing further applications that can be used by SIM 2 (e.g. a Java applet downloadable through the radio connection and locally executed on Z-SIM 2);
  increasing the memory area available for terminal 1 (this is the conventional use of a MMC associated with a mobile terminal).

Memory interface 36: this module allows interfacing core memory 35 with either ZigBee™ module 32 (direct interfacing), or with a host such as terminal 1 (indirect interfacing) for the conventional use of memory card 3. Memory interface 36 allows subdividing the memory space of core memory 35 into a host space (to be used by terminal 1 in conventional manner) and a ZigBee™ space, the latter being utilisable directly by ZigBee™ module 32 and/or by Z-SIM 2 via the radio access to card 3, as said before. In case of a core memory 35 entirely dedicated to ZigBee™ module 32 and/or Z-SIM 2, memory interface 36 can be dispensed with.

Figure 6:
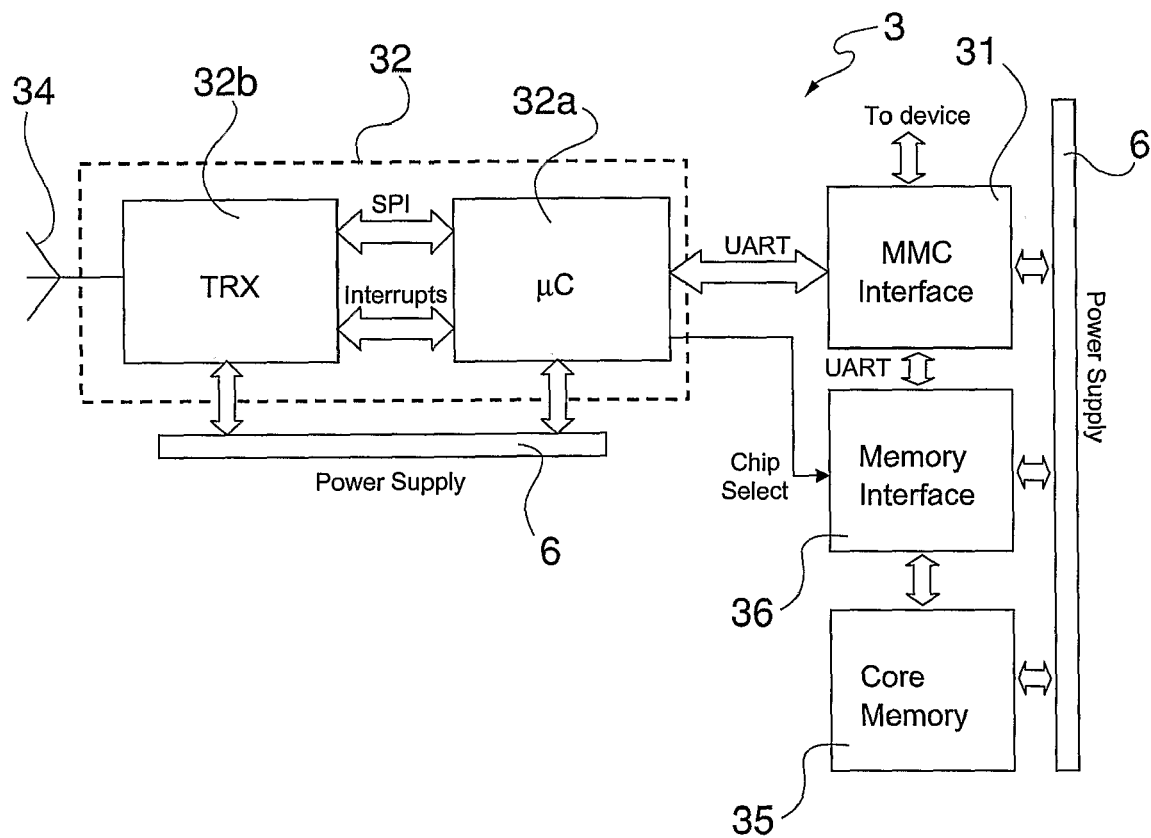
FIG. 6 is a block diagram of the memory card of FIG. 5.

The block diagram of the circuitry on card 3 is shown in FIG. 6, where the elements already shown in FIG. 5 are denoted by the same reference numerals. In the illustrated embodiment, ZigBee™ module 32 comprises separate microcontroller and transceiver chips 32a, 32b, like Z-SIM transceiver module 22 (FIG. 2). Chips 32a, 32b are connected by an SPI interface. Module 32 is connected to MMC interface 31 through a UART interface. Moreover, microcontroller chip 32a embodies the client application 33 (FIG. 5) for the management of Z-MMC 3 by Z-SIM 2. In particular, the client application, after it has been successfully authenticated via the communication with the server application, will enable Z-MMC operation by making micro-controller 32b activate the chip select (CS) pin of memory interface 36 (if present) or core memory 35. Thus, in practice, the access by terminal 1 to the resources on MMC 3 is controlled. If the client does not pass the authentication step, Z-MMC 3 will be automatically disabled by bringing CS to a deactivation state.

The drawing further shows the connections of the different chips to power supply 6 of the host device.

Figure 7:
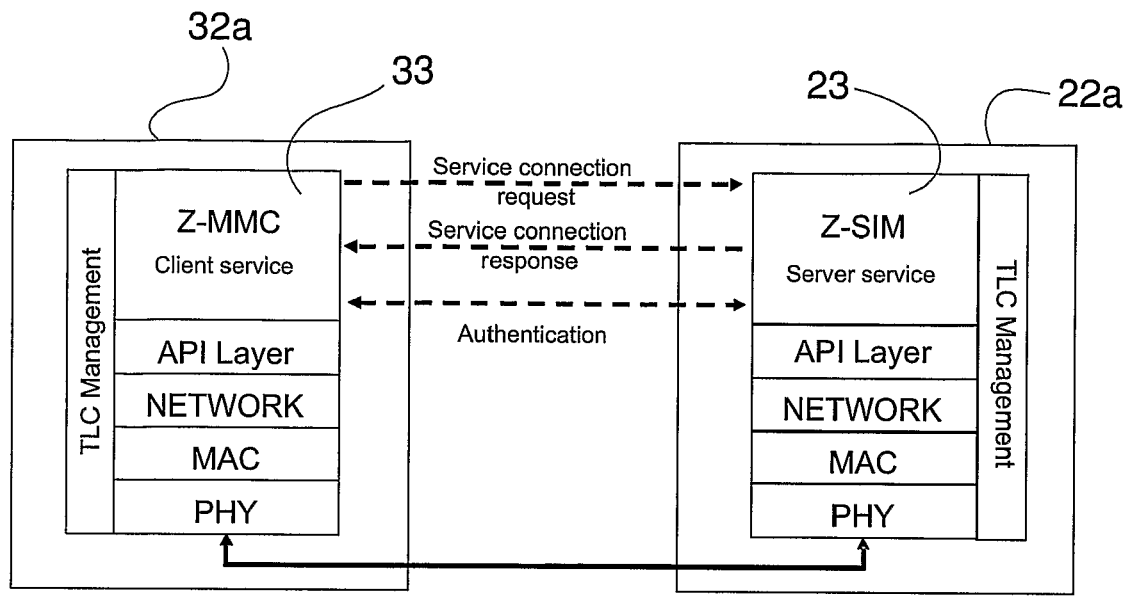
FIG. 7 is a graphical representation of the client/server communications between the memory card and the SIM card during the boot phase.

The initial phase of the interaction between client and server applications 33, 23 on Z-MMC 3 and Z-SIM 2, respectively, is schematically indicated in FIG. 7. The drawing shows the protocol stack (physical layer PHY, medium access control layer MAC, network layer and application layer API) for controllers 22a, 32a of both transceiver modules. Server and client applications 23, 33 are located on top the stack. As shown, client 33 will request connection for a certain service to server 23 and, after the server response, the authentication phase will start.

Figure 8:
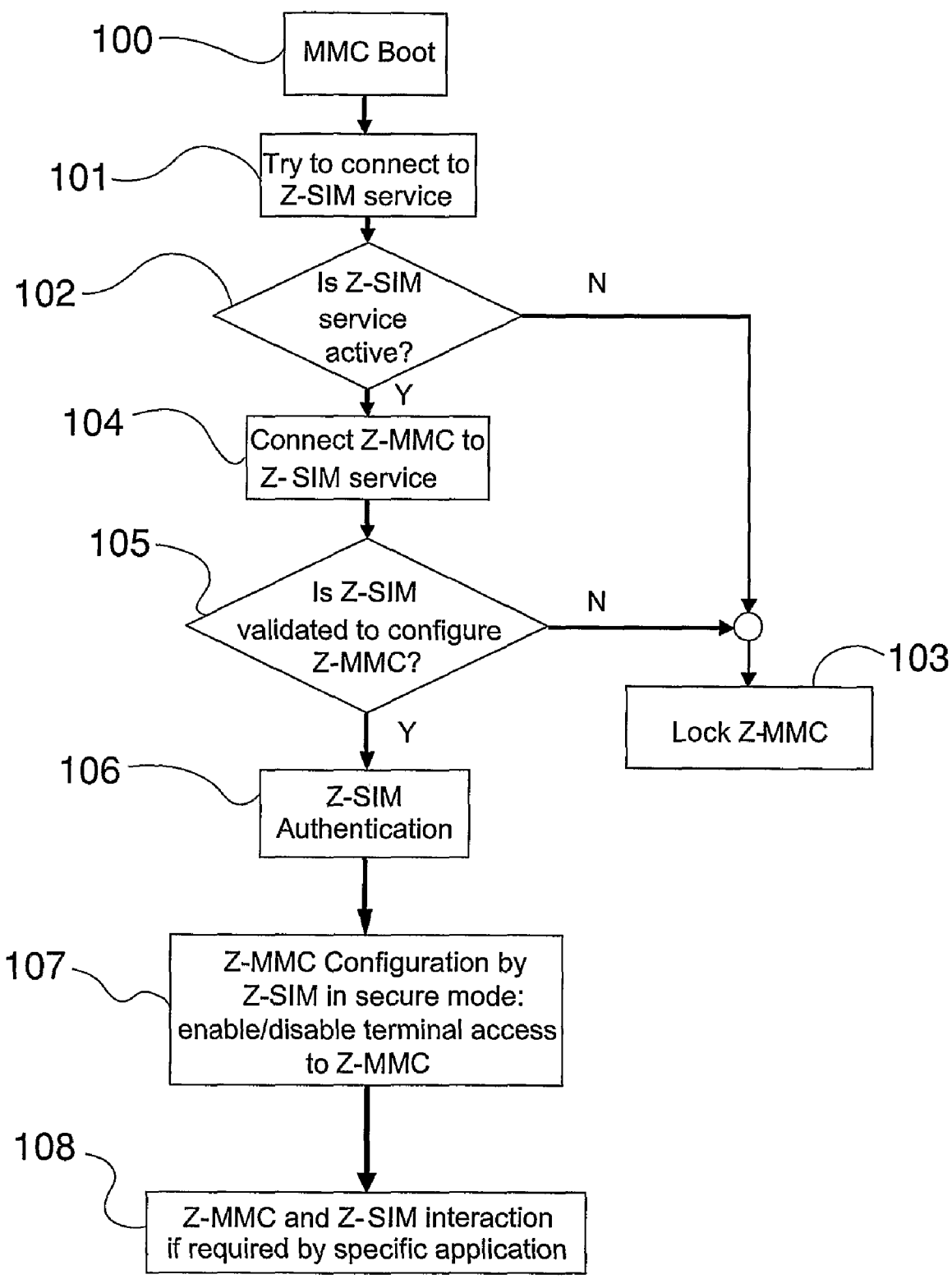
FIG. 8 is a flow chart of the method of the invention.

FIG. 8 shows a flow chart of the Z-MMC management according to the invention. The start is a boot phase that takes place once Z-MMC 3 has been inserted into terminal 1 (step 100). Here, client 33 (FIG. 7) tries to become connected to corresponding server 23 (step 101). Client 33 will attempt the connection to server 23 for a predetermined number of times. If the attempts are unsuccessful, this means that no ZigBee™ service is active on the terminal (output N of step 102), that is, the SIM is not equipped with a ZigBee™ transceiver. Z-MMC will then pass to a lock state (step 103). If on the contrary the connection attempts are successful (output Y of step 102), a logical connection between Z-MMC 3 and Z-SIM 2 is set up by means of the ZigBee™ link (step 104).

Passage to steps 104 or 103 is achieved, as already said, through the CS output of microcontroller 32a (FIG. 5) of transceiver module 32, which will correspondingly apply the proper logical value to the chip select pin of memory interface 36 or, if the latter is lacking, of core memory 35. Note also that if terminal 1 tries to access to the content of a Z-MMC when the chip select pin is de-selected, the result will be an error message or some other suitable signalling (such as "exhausted memory"), depending on the kind of MMC interface 31 being used.

Once the logical connection between Z-MMC 3 and Z-SIM 2 has been set up, an authentication phase can take place, in which Z-MMC is recognised by Z-SIM through standard mechanisms, such as the ones provided for node authentication according to the ZigBee™ standard. Note that a mutual authentication of Z-MMC and Z-SIM can be envisaged for a better security of the process. In this case, also client 33 will be provided with the recognition function.

The authentication must of course be performed by a Z-SIM of the same operator having provided the user with Z-MMC: therefore at step 105 a check is made on whether Z-SIM 2 present in the terminal is validated to configure Z-MMC 3. If the check is successful (output Y of step 105), authentication takes actually place (step 106); otherwise Z-MMC passes to lock state 103, as in the case of failed connection to Z-SIM 2.

After authentication, the process passes to a phase of configuration of Z-MMC by Z-SIM (step 107). The configuration will take place in a secure mode, that is via ciphered communications. Ciphering can be performed for instance by a hardware accelerator included in each transceiver module 22, 32 (FIGS. 2, 6). For such a ciphering, either a symmetric key mechanism or an asymmetric key mechanism can be adopted.

In the case of symmetric key mechanism, Z-MMC 3 and Z-SIM 2 share the same ciphering key. Three sub-cases could be for instance distinguished:
  cards 2 and 3 are bought simultaneously and already contain the common key;
  cards 2 and 3 are bought at different times and they contain a respective key: an initialisation step is to be carried out in which key exchange takes place;
  cards 2 and 3 are bought without the key, which is subsequently assigned via a dialogue between Z-SIM 2 and the network operator and between Z-SIM 2 and Z-MMC 3.

In the case of an asymmetric key mechanism, public and private keys can be used. More particularly, the public keys are obtained through the mobile network (GSM, GPRS, UMTS, EDGE . . . ) whereas the private keys reside on the cards. Z-SIM, being directly connected to the mobile terminal, can get the public key of Z-MMC directly from the network; on the contrary, Z-MMC has to exploit the RF connection with Z-SIM to get the public key of the latter. Of course, the relevant communication is not ciphered.

The ciphered configuration information is downloaded onto ZigBee™ module 32 of memory card 3. For the configuration, possible options may be as follows:

memory locking/unlocking: memory 35, as said, may be configured to contain a portion under the control of the mobile terminal, and hence such portion can be freely managed by applications residing on the terminal (via the conventional, terminal-dependent communication); in the alternative, memory 35 is configured to contain only SIM-controlled data and applications, so that only the terminal-independent communication is possible;

locking/unlocking applications residing on Z-MMC 3 (e.g. Digital Right Management or DRM). Known mechanisms can be used for DRM, and they are controlled by SIM to allow use of applications possibly downloaded from the network;

locking/unlocking further I/O peripheral units present on Z-MMC 3.

Once Z-MMC 3 has been configured, any further interaction with Z-SIM will take place if and as required by the specific application (step 108).

Figure 9:
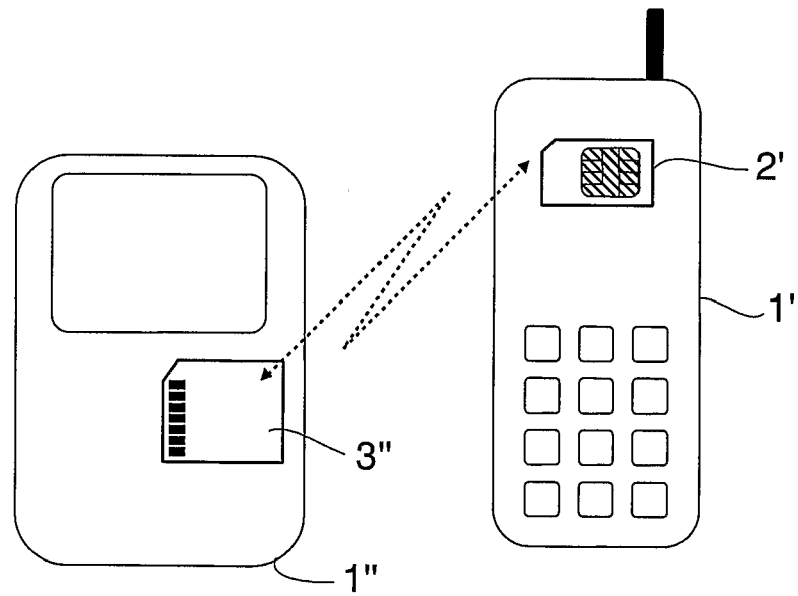
FIG. 9 shows an embodiment with the memory and SIM cards in different terminals.

Note also that the described management method does not require that Z-SIM 2 and Z-MMC 3 belong to a same terminal, and it can be applied also when Z-SIM and Z-MMC are mounted on different devices. This situation is shown in FIG. 9, where Z-SIM 2' is associated with a first terminal 1', e.g. a cellular phone, and is used to enable and configure a Z-MMC 3" residing on a second terminal 1", for instance a PDA (Personal Digital Assistant). It is necessary that terminal 1" can have access to the identity data stored in the SIM on terminal 1', as disclosed e.g. in WO 99/59360 A mentioned above. The access policy for Z-MMC 3" will be set also in this case by Z-SIM 2', like in the case where both cards are mounted on the same terminal.

Figure 10:
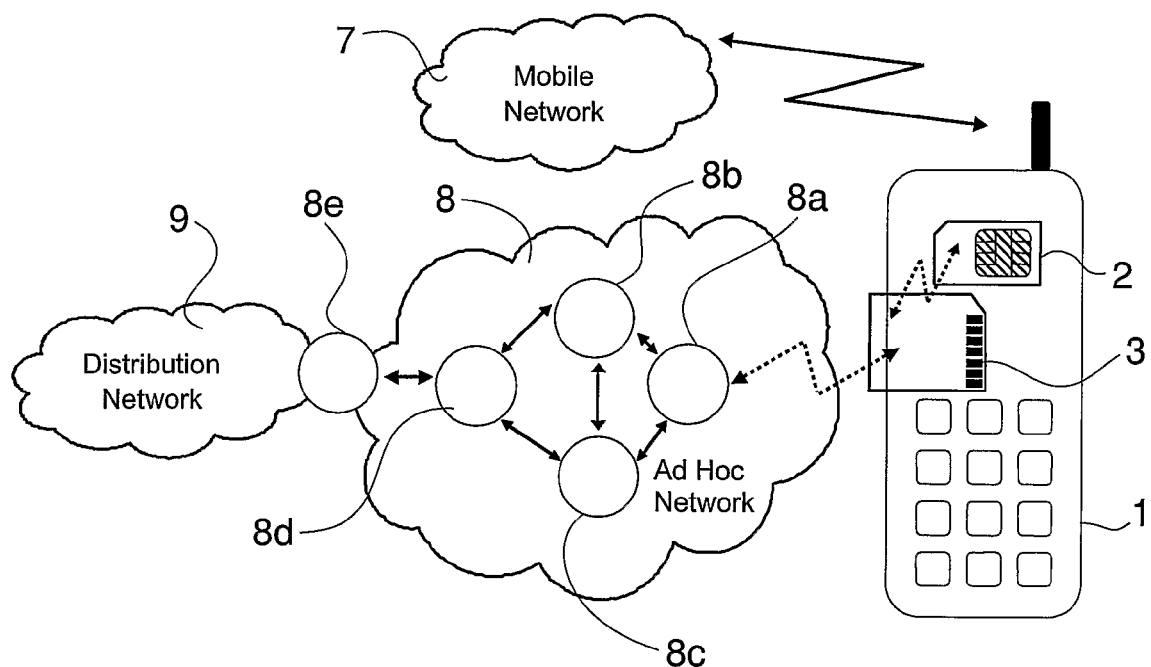
FIGS. 10 and 11 show two exemplary applications of the invention.
Figure 11:
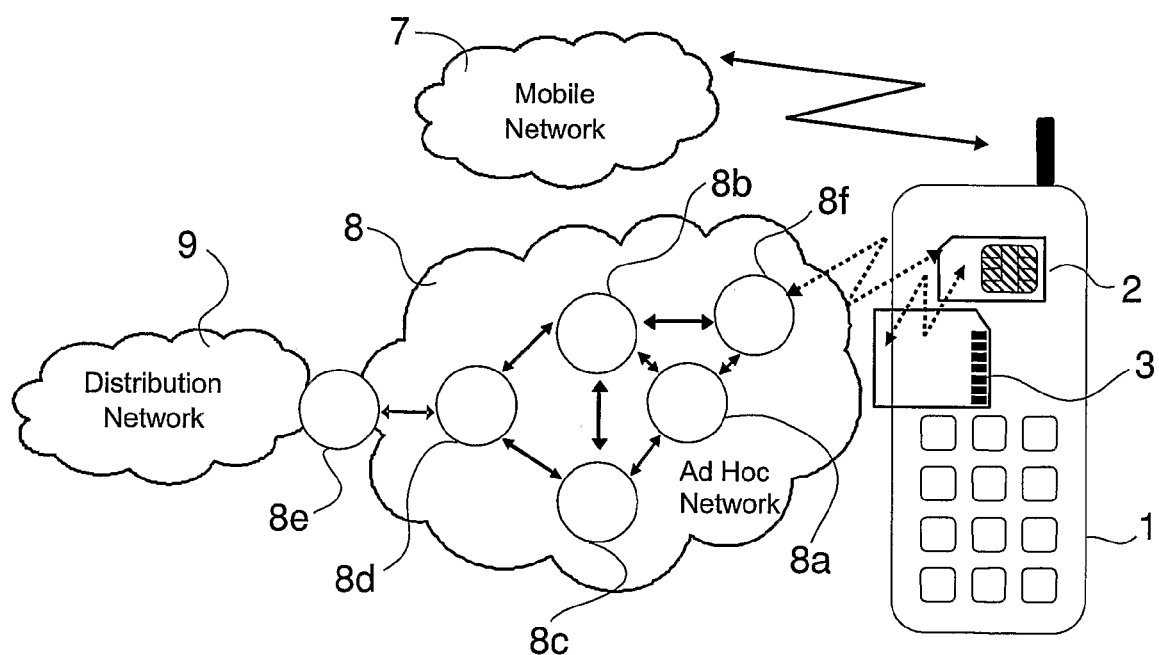

FIGS. 10 and 11 show two possible scenarios of use of a terminal 1 equipped with the described Z-SIM 2 and Z-MMC 3. Reference 7 and 8 denote the mobile communication network to which terminal 1 is connected and a personal area network (ad hoc network) accessible through Z-SIM 2 and/or Z-MMC 3, which form two nodes of network 8. The latter comprises a plurality of further nodes, denoted 8a to 8e in FIG. 10 and 8a to 8f in FIG. 11. Depending on the specific application ad hoc network 8 is used for, such nodes can be classified into:

simple nodes: they contain information related to the node proximity to specific areas, or may act as pointers towards other information; depending on the application, they will transmit their information spontaneously, or upon request, for instance from Z-SIM 2;

sensor nodes: they detect measurable quantities from the surrounding environment and transmit the measured values after having possibly processed them through an application contained in the node itself;

driver nodes: they are capable of interacting with the surrounding environment through commands that can cause direct or indirect effects (for instance, turning on/off the lights in a room or adjusting their intensity, controlling an air conditioning installation, etc).

FIG. 10 shows a scenario in which Z-SIM 2 uses Z-MMC 3 to expand its operation range and to communicate with the external world. In other words the transmission from Z-SIM uses Z-MMC as a repeater. This allows using Z-SIM 2 for longer-range communication notwithstanding shielding effects of mobile terminal 1, especially in case of terminals in which Z-SIM 2 is located under the battery. Once the transmission from Z-MMC 3 has reached the closest node (e.g. 8a) inside network 8, it can propagate from one node to the adjacent one, according to the conventional ZigBee™ technique.

In the configuration shown in FIG. 11, Z-MMC 3 is used as an additional memory for Z-SIM 2, which can directly access ad hoc network 8. In this case, Z-SIM 2 can take from Z-MMC 3, by using the ZigBee™ connection, the application program associated to the service requiring access to network 8 and then execute it.

Of course, even if a single terminal 1 is shown, Z-SIM 2 and Z-MMC 3 could belong to different terminals.

In both Figures, one of the nodes of ad hoc network 8, e.g. node 8e, gives access to a further network 9, referred to as distribution network, through which the user can access further services/applications/information, e.g. for firmware update or for synchronisation with remote information available on that network. Network 9 could be a mobile communication network, possibly coinciding with mobile network 7, or be the fixed network. Nodes like node 8e, having gateway functions, will have peculiar processing capacities.

The advantages afforded by the present invention are readily apparent.

providing the subscriber identity unit (SIM card) and a peripheral unit (e.g. a flash memory card) of mobile terminals with respective radio transceivers operating in a frequency range different from that of mobile communications allows setting up radio communications between the two units without passing through the terminal and the mobile network, even when the two units are carried by different terminals;

Z-SIM 2 or 2' can be used to authenticate any peripheral unit 3 or 3" similarly equipped with a radio transceiver;

Z-SIM 2 or 2' can be used to manage applications subjected to DRM and residing on peripheral unit 3 or 3";

through Z-SIM 2 or 2', it is possible to reconfigure peripheral unit 3 or 3" by choosing and updating the security policy;

it is possible to extend the operation range of Z-SIM 2 or 2', for instance when the latter is shielded by the terminal battery, by utilising peripheral unit 3 or 3" as a multi-hop node.

It is evident that the above description has been given by way of non-limiting example and that changes and modifications are possible without departing from the scope of the invention.

For instance, even if the described embodiment refers to the management of a memory card, the invention allows extending the security area of a Z-SIM to I/O peripheral units of different kinds added to a terminal and equipped with a ZigBee™ module matching that of Z-SIM 2. Examples could be speech synthesis/recognition units, HW accelerators etc. Note that some of those peripheral units might lack core memory 35, and hence memory interface 36, and rely only on the memory of controller 32a. In such case the Z-MMC locking or inhibition of the memory in the absence of a suitable Z-SIM concerns the controller memory and can be performed by the controller software.

The invention claimed is:

1. A method for the management of a peripheral unit by a subscriber identity unit of a terminal of a communication network, comprising:

providing for radio communication between a first radio transceiver module included in the subscriber identity unit and a second radio transceiver module included in the peripheral unit, the providing comprising establishing a client application on the second transceiver module of the peripheral unit and a server application on the first transceiver module of the subscriber identity unit, for governing the radio communication;

setting up a connection between said transceiver modules for supporting said radio communication;

recognising and authenticating said peripheral unit by said subscriber identity unit via said radio communication; and configuring, in secure mode through a ciphered communication, said peripheral unit by said subscriber identity unit via said radio communication, wherein ciphering in said ciphered communication comprises at least one of:

a first symmetrical key procedure comprising storing a key on each unit prior to association with a same terminal or respective terminals, and exchanging keys between said units after authentication, via said radio communication;

a second symmetrical key procedure comprising associating each unit with a same terminal or respective terminals, each unit having no keys stored thereon, and transferring after authentication, one or more keys from a communication network to the subscriber identity unit, and from the subscriber identity unit to the peripheral unit; and an asymmetrical key procedure comprising storing a private key or a respective private key on each unit prior to association with a terminal or respective terminals and, after authentication, transferring one or more public keys from a communication network to the subscriber identity unit, and from the subscriber identity unit to the peripheral unit.

2. The method as claimed in claim 1, wherein said authentication step further comprises an authentication of said subscriber identity unit by said peripheral unit.

3. The method as claimed in claim 2, further comprising inhibiting the peripheral unit via said client application if the connection with the server application cannot be set up or if the authentication is unsuccessful.

4. The method as claimed in claim 1, wherein ciphering in said ciphered communication comprises using the first symmetrical key procedure where the keys stored on both units are identical.

5. The method as claimed in claim 1, wherein said peripheral unit is a memory card.

6. The method as claimed in claim 5, wherein said configuring step comprises subdividing a storage capacity of said peripheral unit into a first area reserved to said terminal of the communication network, and a second area reserved to said subscriber identity unit or to the transceiver module of said memory card.

7. The method as claimed in claim 1, wherein said subscriber identity unit is a subscriber identity module or universal subscriber identity module card of a mobile terminal.

8. The method of claim 1, wherein the providing comprises establishing a client application on the second transceiver module and a server application on the first transceiver module, for governing the radio communication.

9. A peripheral unit comprising a radio transceiver module, wherein a control part of said radio transceiver module comprises a client application arranged to communicate with a server application in a control part of a corresponding radio transceiver module included in a subscriber identity unit of a terminal of a communication network, for at least the authentication of said peripheral unit by said subscriber identity unit; and wherein the peripheral unit is configured, in secure mode through a ciphered communication, by said subscriber identity unit via radio communication, wherein ciphering in said ciphered communication comprises at least one of:

a first symmetrical key procedure comprising storing a key on each unit prior to association with a same terminal or respective terminals, and exchanging keys between said units after authentication, via said radio communication;

a second symmetrical key procedure comprising associating each unit with a same terminal or respective terminals, each unit having no keys stored thereon, and transferring after authentication, one or more keys from a communication network to the subscriber identity unit, and from the subscriber identity unit to the peripheral unit; and an asymmetrical key procedure comprising storing a private key or a respective private key on each unit prior to association with a terminal or respective terminals and, after authentication, transferring one or more public keys from a communication network to the subscriber identity unit, and from the subscriber identity unit to the peripheral unit.

10. The peripheral unit as claimed in claim 9, wherein said client application further comprises a recognition function for recognition and authentication of said subscriber identity unit by said peripheral unit.

11. The peripheral unit as claimed in claim 9, wherein said client application comprises a configuration function, enabled upon recognition and authentication of the client application by said server application, for enabling said control part of the transceiver module of said peripheral unit to receive configuration information sent by said server application via said radio communication, and to consequently determine access polices to the peripheral unit itself.

12. The peripheral unit as claimed in claim 11, wherein said client application further comprises a ciphering function for ciphering communications with said subscriber identity unit following the configuration.

13. The peripheral unit as claimed in claim 9, wherein said transceiver modules are transceiver modules operating according to ZigBee™ standard.

14. The peripheral unit as claimed in claim 9, wherein said peripheral unit is a memory card.

15. The peripheral unit as claimed in claim 14, wherein said memory card comprises a memory unit and interface means for allowing a shared use of said memory unit by said subscriber unit or by the transceiver module of said peripheral unit.

16. The peripheral unit as claimed in claim 15, wherein the peripheral unit is associated with a terminal different from the terminal equipped with the managing subscriber identity module or universal subscriber identity module card and is capable of accessing subscriber identity data present on said subscriber identity module or universal subscriber identity module card.

17. The peripheral unit as claimed in claim 14, wherein said memory card comprises a memory unit for exclusive use by said subscriber unit and/or by the transceiver module of said memory card.

18. A terminal comprising a peripheral unit according to claim 9.

* * * * *